United States Patent [19]

Baggio et al.

[11] Patent Number: 4,546,418

[45] Date of Patent: Oct. 8, 1985

[54] MINI CENTER FOR ELECTRICAL POWER DISTRIBUTION

[75] Inventors: Horacio Baggio, Niles; George R. Eckart, Evanston, both of Ill.; Louis A. DeBeradinis, Stamford, Conn.

[73] Assignee: Woodhead Industries, Inc., Northbrook, Ill.

[21] Appl. No.: 659,506

[22] Filed: Oct. 10, 1984

Related U.S. Application Data

[63] Continuation of Ser. No. 523,048, Aug. 15, 1983, abandoned.

[51] Int. Cl.⁴ ............................................. F21V 33/00
[52] U.S. Cl. ........................................ 362/85; 362/95; 362/375; 361/363
[58] Field of Search .................. 362/85, 95, 226, 276, 362/375; 174/38; 339/44 R, 36, 43, 39, 44 M; 361/334, 363, 426, 357

[56] References Cited

U.S. PATENT DOCUMENTS

| | | | |
|---|---|---|---|
| Re. 24,393 | 11/1957 | McCarthy | 362/95 X |
| 2,578,190 | 12/1951 | Kurtzon | 362/375 |
| 3,341,268 | 9/1967 | Bickford | 174/38 |
| 4,307,436 | 12/1981 | Eckart et al. | 361/363 |
| 4,343,032 | 8/1982 | Schwartz | 362/276 |

Primary Examiner—Craig R. Feinberg
Attorney, Agent, or Firm—Emrich & Dithmar

[57] ABSTRACT

A power distribution center for use at marinas, trailor camps and the like includes a housing adapted to receive power feed cable from an external power source, the cables being connected to terminal blocks mounted within the housing and to which are connected terminals of electrical receptacles mounted within the housing. The housing includes a cover which when opened provides access to the receptacles. A light source including a diffusing lens mounted within the upper portion of the housing is effective to illuminate the front portion of the housing both when the cover is closed and when it is opened. The housing and cover are of a corrosion resistant synthetic material, and internal metallic brackets and plates which mount the terminals, receptacles and light source are electrically connected to the ground terminal which provides a unitized ground on a single ground lug.

10 Claims, 4 Drawing Figures

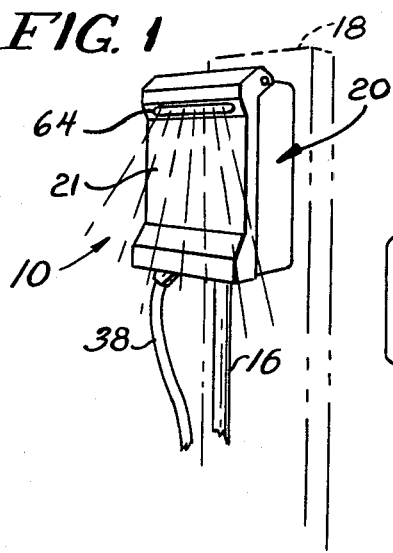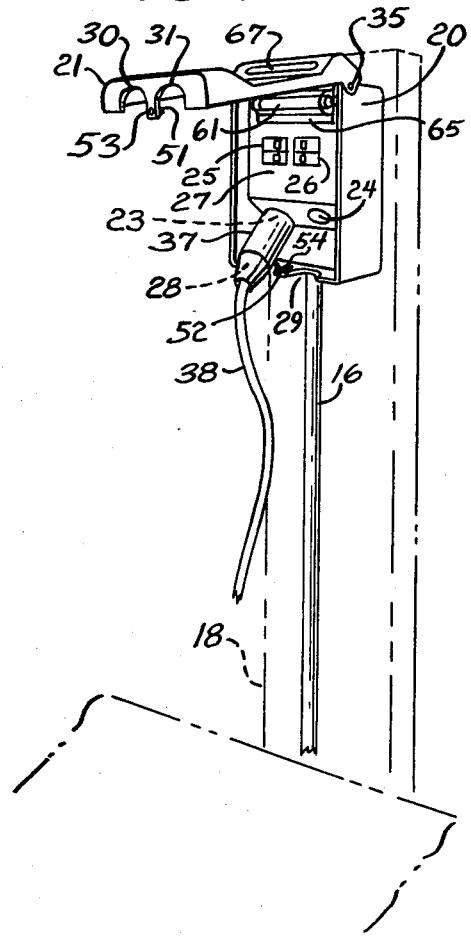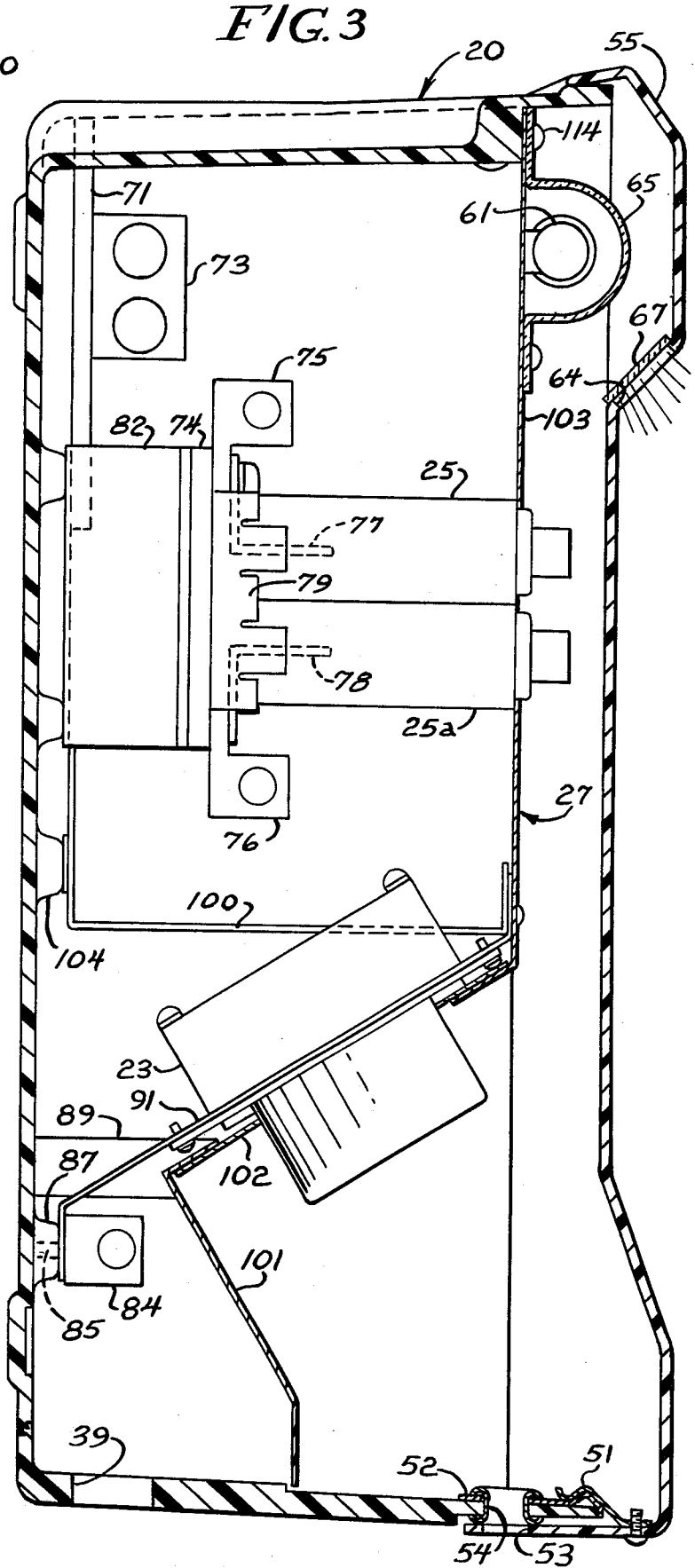

MINI CENTER FOR ELECTRICAL POWER DISTRIBUTION

This is a continuation of application Ser. No. 523,048, filed Aug. 15, 1983 now abandoned.

BACKGROUND OF THE INVENTION

This invention relates to electrical power distribution centers and more particularly to a power distribution center assembly adapted for use in distributing electrical power to electrical equipment in boats, campers, and the like.

In past years, furnishing electrical power to mobile vehicles, such as boats docked at a pier, campers in a trailer camp, and the like, amounted to errecting a support in the form of an upwardly extending board and mounting a suitable junction box and receptacle on the board. Power conductors from a source of electrical power were connected to the junction box which was wired to the receptacle. When a boat or other vehicle parked next to the junction box needed external electrical power, a power cable connected to electrical equipment on board the vehicle was plugged into the receptacle. Such power distribution arrangement was not only unsightly but also unsafe because the electrical wiring connections were exposed in most installations, and because there was generally no provision for protection of the power distribution apparatus from the elements.

In recent years, improved power distribution systems have been proposed which are in the form of a housing which encloses connections between the electrical power feed cables and receptacles, and which provides suitable mounting for the electrical receptacles in a safe yet aesthetically pleasing manner. One example of such power distribution center is disclosed in U.S. Pat. No. 4,307,436 which is assigned to Daniel Woodhead, Inc., the assignee of the present application. This power distribution center is in the form of a pillar shaped housing which mounts a plurality of receptacles on one side thereof. Electrical wiring from a source of electrical power extends into the housing through the bottom thereof and are attached to the back side of the receptacles internally of the housing. Each receptacle has an associated cover which enables the receptacle to be covered when not in use. Other known power centers for outdoor use were adapted for post mounting with the electrical power feed conductors extending up through the post and into the housing. In most of these installations, the receptacles are mounted within the housing. The housing has a flip up cover on the front side thereof to provide access to the receptacles. Generally, these prior art power distribution centers have housings made of cast aluminum, stainless steel, or the like. While such housings were corrosion resistant and thus provided good protection from the elements, the metalic housing resulted in increased cost for the unit.

Some of these prior art power distribution centers included a light fixture for illuminating the power center at night. The light fixture was mounted on the top of the unit and included a louvred housing to direct light downwardly when the lamp was lit. A disadvantage of known lighting arrangements for outdoor power distribution centers is that when the receptacle cover or housing cover was moved to its open position to plug in or remove power cords, or to operate the circuit breakers, the cover blocked the light from illuminating the receptacles and circuit breakers.

SUMMARY OF THE INVENTION

The present invention provides an improved power distribution center for furnishing electrical power to electrical equipment at marinas, trailor camps, or mobile equipment at other outdoor areas where vehicle owners want to use electrical power from an external source while their vehicle is parked.

In accordance with the invention the power distribution center comprises a housing in which is mounted a neutral terminal assembly, a hot terminal assembly and a ground terminal assembly, each of which includes terminal lugs to which are connected neutral, hot and ground conductors of a power distribution feeder cable. A mounting bracket mounted within the housing mounts at least one electrical receptacle adapted to receive plug of a power cable for providing power to a boat or vehicle parked next to the power distribution center. A circuit breaker is provided to permit actuation and deactuation of each receptacle as desired. A cover plate mounted within the housing in the forward portion thereof encloses the terminal mount assemblies and the receptacle and circuit breaker mounting brackets.

In accordance with one aspect of the invention, the mounting brackets for the receptacles and the circuit breakers as well as the cover plate are of a corrosion resistant metal and each of these elements is electrically connected to the ground terminal of the power distribution system. A single connector is used for the incoming ground connection providing a unitized ground on one lug. The housing is made of a synthetic material such as fiberglass reinforced polyester. This results in a housing which is not only rust proof but also more easily fabricated and of lower cost while providing a durable housing for the power distribution apparatus. In accordance with a feature of the invention, the cover for the housing is pivotally mounted on the housing by way of grooved hinge pins and X-washers. This provides a simple, inexpensive and yet effective way of pivotally attaching the cover to the housing.

In accordance with a further aspect of the invention, a light source is mounted on the inner cover plate under the top portion of the cover and a diffusing lens is mounted on the cover plate over the lamp. A horizontally extending slot is provided in the cover adjacent to the lamp so that when the cover is closed, light diffused by the lens passes through the slotted cover and softly illuminates the front of the power distribution center. Likewise, when the cover is open, the light illuminates the forward panel of the power distribution center including the circuit breakers and receptables mounted thereon.

Other features and advantages of the invention will become apparent upon reading of the following detailed description.

DESCRIPTION OF THE DRAWINGS

FIG. 1 is a perspective view of a power distribution center provided by the present invention shown mounted on a post;

FIG. 2 is a perspective view of the power distribution center of FIG. 1 with the front cover shown in its open position;

FIG. 3 is a side sectional view of the power distribution center showing the circuit breakers and receptacles.

DESCRIPTION OF A PREFERRED EMBODIMENT

Figure 4:
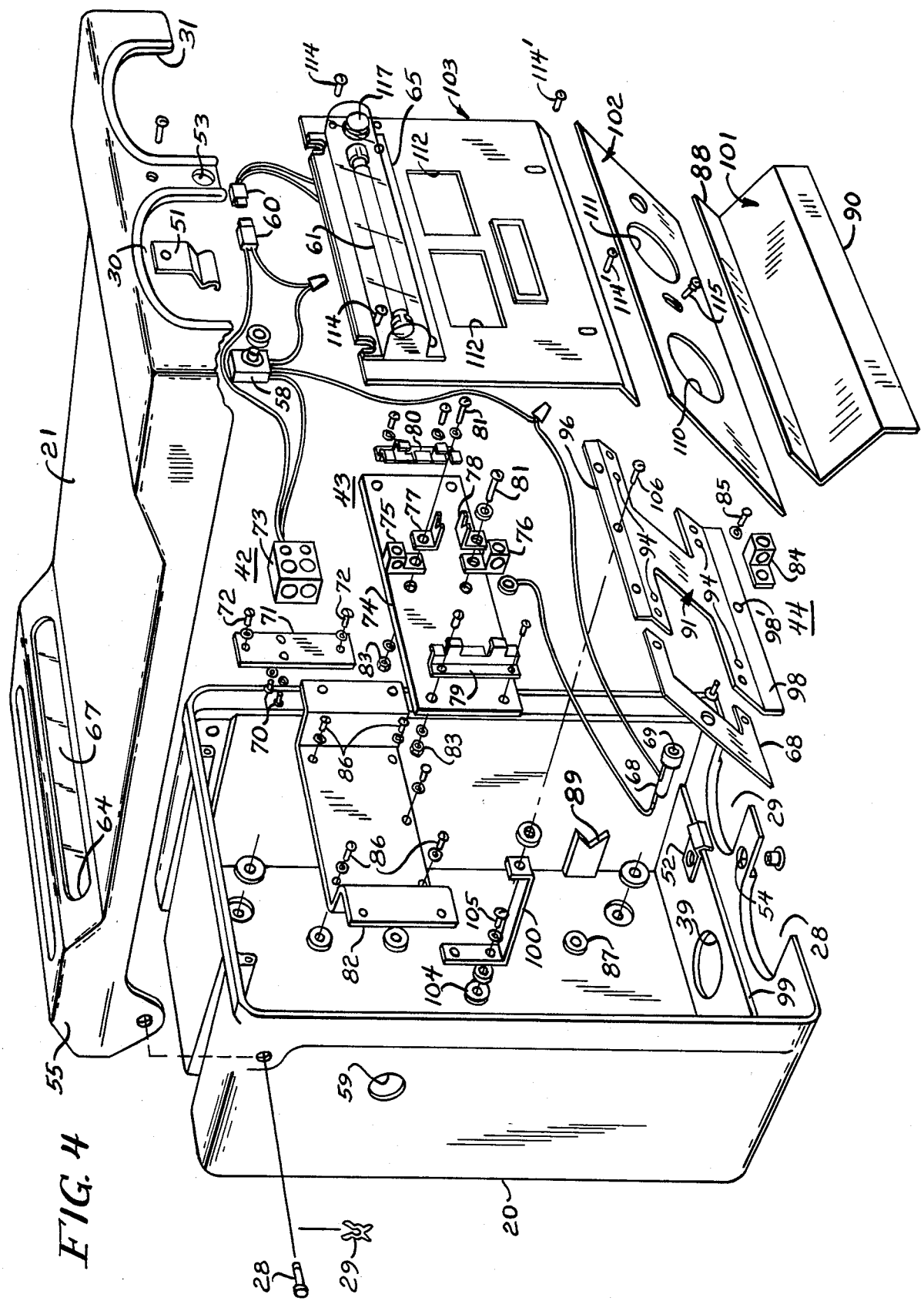
FIG. 4 is an exploded perspective view of the power distribution center with the circuit breakers and receptacles removed.

Referring to FIGS. 1 and 2 of the drawings, the power distribution center 10 of the present invention includes a housing 20 which is shown mounted on a vertically extending pillar 18. The housing 20 has a flip-up type cover portion 21 which normally closes the front portion of the housing as illustrated in FIG. 1 but is openable, as illustrated in FIG. 2, to provide access to a pair of electrical receptacles 23 and 24 and associated circuit breakers 25 and 26 which are mounted within the housing. As will be described, the receptacles 23 and 24 and the circuit breakers 25 and 26 are electrically connected to power feed conductors from an external electrical power source. A cover plate 27 mounted on the forward portion of the housing 20 defines a rearward compartment in which the electrical connections are made between the incoming power conductors, represented by a cable 16, and the receptacles and circuit breakers.

In the disclosed embodiment, the power distribution center has bottom feed conduit provision, but may be adapted for back feed conduit provisions where applications require. It is pointed out, that in some instances, it is desirable to provide an electrical meter in addition to the electrical outlets to facilitate billing of the customer for the amount of electricity used. Although not illustrated, a separate housing would be provided for the meter and mounted above the housing 20 provided for the power outlets.

The housing and cover are of a synthetic material, such as fiberglass reinforced polyester, to provide a housing which is corrosion resistant and impervious to moisture and water. The back and side walls of the housing, and the cover 21, are approximately ⅛" in thickness whereas the top and bottom portions of the housing are approximately ¼" in thickness to provide additional strength for conduit feed in and for the meter mount when applicable.

The receptacles employed may be 15A and 20A single and duplex receptacles or may be 20A, 30A and 50A twist lock receptacles. For single receptacles, a single circuit breaker is provided for each receptacle. In the present illustration, it is assumed that double receptacles, such as receptacle 23, are used, and a pair of circuit breakers 25, 25A is provided to enable individual activation of each circuit.

As illustrated in FIG. 2 the housing includes a pair of notches 28 and 29 on its bottom edge to enable the cover, provided with mating notches 30 and 31, to close over the plug 37 of a power cord 38 when it is plugged into the receptacle. A member 51 secured to the bottom of the cover cooperates with a member 51 secured to the bottom of the of the housing to define a snap latch at the base of the unit. Aperture 53 in the cover and aperture 54 in the housing bottom are provided to receive a padlock, permitting the cover to be locked closed when desired.

A fluorescent light 61 is mounted under the top portion of the cover 21. The upper portion of the cover 21 defines an outwardly extending surface 55 defining a lamp compartment in which the fluorescent lamp is contained. A diffusing lens 65 mounted on the upper portion 103 of inner cover 27 encloses the lamp 61. The housing cover 21 defines an aperture 64 over which is mounted a clear lens 67. Lens 67 may, for example, be glued along its edges to the inner surface of the cover. The lens 67 defines a light port which enables light to pass through the cover when it is closed but which affords protection against water or moisture from entering the housing through the light port. In accordance with a feature of the invention, the light source is effective to illuminate the front of the power distribution center both when the cover 21 is open and when the cover is closed. When the housing cover is closed as in FIG. 1, the light passing through the diffusing lens 65 and clear lens 67 softly illuminates the front surface of the power distribution unit. Likewise, when the cover is raised, as in FIG. 2, light from the fluorescent lamp passes through lens 65, illuminating the front surface cover plate, the receptacles 23 and 24 and the circuit breakers 25 and 26.

The cover 21 is pivotally mounted on the housing proper by way of a pair of grooved hinge pins 35 and X-washers 36. The mounting arrangement simplifies installation and removal of the cover and provides a simple yet inexpensive pivotal mount for the cover. The cover could have a stay open position for convenience.

Considering the power distribution center in more detail, with reference to FIGS. 3 and 4, mounted within the housing 20 are a neutral terminal assembly 42, a hot terminal assembly and circuit breaker mount 43 and a ground terminal mount assembly 44. The neutral terminal assembly 42, which is mounted in the upper portion of the housing, includes a terminal board 71 which is attached to the inside of the housing by screws 72, and a terminal lug 73 which is attached to the terminal board 71 by screws 70.

The hot terminal and circuit breaker mount 43 includes a terminal board 74, of an insulating material, on which is mounted two terminal lugs 75 and 76 to which are connected two terminal blocks 77 and 78 by bolts 81 and nuts 83. A pair of circuit breaker supports 79 and 80 are attached to the terminal board 74 at opposite edges thereof. The circuit breaker supports and the terminal blocks mount the circuit breakers (shown in FIG. 3). The terminal board assembly in turn is attached to the back side of the housing 20 by way of a metal mounting plate 82 attached to the housing by screws 86.

The ground circuit includes a terminal lug 84 which is attached to the back side of the housing, as shown best in FIG. 3, by way of a screw 85. As will be shown the ground terminal is electrically connected to the mounting plates and brackets within the housing, and a single ground terminal is used to provide unitary grounding for the power distribution center.

The power distribution center is adapted for use with a three-phase four-wire feeder including two hot wires, a neutral wire and a ground wire. The power feeder cable (not shown in FIG. 4) may extend into the housing through a hole provided in the back of the housing, or as illustrated, through a hole 39 provided in the bottom of the housing. The conductors of the feeder cable are connectable to the appropriate terminal lugs 73, 75, 76 and 84. It is pointed out that the components of the power distribution center are factory wired and assembled to simplify installation and reduce installation time.

A metal mounting bracket 91 is mounted in the housing in the lower portion thereof and serves to mount the receptacles 23 and 24 (FIG. 2). Mounting holes 94 are provided in the mounting bracket to facilitate attachment of the receptacles thereto by way of nuts and bolts. The mounting bracket 91 has a lower lip portion 98, having a mounting hole 98' which facilitates attachment to the back surface of the housing by way of screw 85 which is received in a tapped boss 87 formed on the housing back wall. A metal spacing member 100, which is attached to the back surface of the housing at 104 by screw 105, is attached to the receptacle mounting bracket 91 adjacent to its upper edge 96 by a suitable fastener 106 to secure the receptacle mounting bracket to the housing.

The housing internal cover assembly 27 includes a metal bottom cover portion 101, a metal receptacle portion 102 and a metal circuit breaker cover portion 103. Bottom cover 101 has a vertically extending cover edge 90 which engages a shoulder 99 formed in the bottom inner surface of the housing 20, and a V-shaped upper portion 88 the edges of which are received in a pair of V-shaped bosses 89, one of which is shown in FIG. 4, formed on the inner surfaces of the housing sidewalls. Bottom cover portion 101, is held in place by the lower part of cover portion 102 which overlies the upper edge of cover 101 as shown in FIG. 3. The receptacle portion 102 has apertures 110 and 111 through which pass the outlet connector portions of the receptacles. Similarly, circuit breaker cover 103 includes a pair of apertures 112 through which the circuit breakers 25 and 26 are exposed. The cover assembly 27 is attached to the housing 20 at the upper portion thereof by way of screws 114 and to the receptacle mounting bracket 91 by way of screws 114'.

As shown best in FIG. 3, the ground terminal 84 is electrically connected to the metallic mounting bracket 91 which in turn is electrically connected to the circuit breaker mount 82 through spacer 100, defining a metallic connection therebetween. Moreover, the receptacle mounting bracket 91 and circuit breaker mount 82 are also electrically connected to the front cover assembly 27 thus connecting cover assembly 27 to the ground terminal. Consequently, internal metal parts of the unit, such as mounting plates 82, and 91, as well as the front cover panel assembly 27, are electrically grounded.

The upper portion of the circuit breaker cover 103 mounts light source, embodied as the fluorescent lamp 61 and associated activating elements such as the ballast (not shown) and starter 117, as well as the diffusing lens 65. The fluorescent lamp and its associated circuit are conventional and will not be described in detail. A photo electric control may be provided to activate the fluorescent light at dusk. To this end, a photo electric switch device 58, illustrated in FIG. 4, is adapted for mounting in aperture 59 in the side of the housing with its photo sensitive surface exposed in the side of the housing. In addition, a quick disconnect plug 60 is provided to permit removal of the circuit breaker cover 103 and the light source as a unit. The receptacle mounting bracket 91 further mounts a fuse mounting bracket 68 which supports a fuse holder with a ceramic fuse 69 which is connected in circuit with the fluorescent tube 61.

From the foregoing, it is apparent that the present has provided an improved power distribution center which includes a combination of an inexpensive synthetic housing and corrosion resistant metal parts within the housing and in which all the internal metal parts are electrically connected to the ground terminal. In addition, the power distribution center employs a light source which is effective in illuminating the power distribution center both when the housing cover is closed or opened, providing soft illumination by virtue of its diffusing lens, the circuit breakers and receptacles mounted within the housing when the cover is open. In addition, the use of grooved hinge pins 35 and X-washers 36 provides a simple yet effective mounting arrangement for the cover.

We claim:

1. In a power distribution center assembly for outdoor use in distributing electrical power to electrical equipment, the combination comprising: a housing having a forward open end and a cover pivotally mounted at one edge of said housing for hinging movement between a closed position in which said cover closes the open end of said housing and an open position for permitting access within said housing; a cover plate mounted in said housing at least one electrical receptacle mounted on said cover plate within said housing and adapted to receive a plug of an electrical power cord associated with said electrical equipment; said receptacle being enclosed within said housing and said power cord passing through an aperture in said housing when said cover is in its closed position; said receptacle being exposed for access when said cover is in its open position; and illuminating means mounted within said housing, said cover including a downwardly and rearwardly sloped surface having a slot defining a light port in said cover adjacent to said illuminating means wherein when said cover is in its closed position, light diffused through the light port in said cover is transmitted downwardly and illuminates a front portion of the power distribution center assembly and areas beneath the assembly, and when said cover is in its open position, light from said illuminating means directly illuminates the forward open end of said housing and said receptacle mounted within said housing.

2. A power distribution assembly according to claim 1 wherein said housing and said cover are made of a synthetic material.

3. A power distribution assembly according to claim 1, further comprising receptacle mounting means for mounting said receptacle within said housing, said receptacle further having a terminal portion; and first, second and third terminal assemblies mounted within said housing for connection to at least first, second and third conductors of a power feed cable, and for connection to said terminal portion of said receptacle, one of said terminal assemblies including a single ground terminal which is connected to said receptacle mounting means and to said cover plate to define a unitary ground system for the power distribution center assembly.

4. A power distribution assembly according to claim 1 wherein said illuminating means further comprises a light source mounted on said cover plate and a lens mounted on said cover plate and enclosing said light source.

5. A power distribution assembly according to claim 4 which includes a further lens mounted on said cover in the light port defining slot thereof, said further lens being transparent to permit light transmission therethrough while defining a barrier to moisture.

6. A power distribution assembly according to claim 4 which includes power terminals mounted within said housing and adapted for connection to conductors of feed cable, and wherein said light source comprises a fluorescent lamp which is connected in circuit with said power terminals for energizing said lamp, said light source including switch means for enabling selective energization of said lamp.

7. A power distribution assembly according to claim 6 wherein said switch means comprises photoelectric switch.

8. In a power distribution center assembly for outdoor use in distributing electrical power to electrical equipment, the combination comprising: a housing having a forward open end, a cover, and mounting means for pivotally mounting said cover at the top of said housing for hinged movement between a closed position in which said cover closes the open end of said housing and an open position to permit access within said housing, a cover plate mounted within said housing adjacent to its open end and having a downwardly and rearwardly inclined mounting surface, at least one electrical receptacle, receptacle mounting means for mounting said receptacle to said mounting surface within said housing, said receptacle having an outlet portion adapted to receive a plug of an electrical power cord associated with said electrical equipment and having a terminal portion adapted for connection to a power feed cable, one of said terminal assemblies including a single ground terminal connected to said receptacle mounting means and to said cover plate to define a unitary ground system for the power distribution center assembly, a circuit breaker mounted on said cover plate, said receptacle and said circuit breaker being enclosed within said housing, said housing adapted to pass therethrough a cord connected to said receptacle when said cover is closed and being exposed for access when said cover is pivoted to its open position, and illuminating means mounted within said housing in the upper portion thereof, said cover including a downwardly and rearwardly inclined surface having a slot defining a light port in said cover beneath said illuminating means wherein when said cover is in its closed position, light diffused through the light port in said cover illuminates a front portion of the power distribution center assembly and the area beneath the assembly, and when said cover is in its open position, light from said illuminating means directly illuminates the forward open portion of said housing and said receptacle and circuit breaker mounted therewithin.

9. A power distribution assembly according to claim 8 wherein said illuminating means comprises a light source mounted on said cover plate and a lens mounted on said cover plate and enclosing said light source.

10. A power distribution assembly according to claim 9 which includes a further lens mounted on said cover in the light port defining slot thereof, said further lens being transparent to permit light transmission therethrough while defining a barrier to moisture.

* * * * *